United States Patent [19]

Ideta

[11] 4,338,855
[45] Jul. 13, 1982

[54] RELIEF VALVE MECHANISM FOR A HYDRAULIC BOOSTER

[75] Inventor: Yasufumi Ideta, Tokyo, Japan

[73] Assignee: Nissan Motor Co., Ltd., Yokohama, Japan

[21] Appl. No.: 112,526

[22] Filed: Jan. 16, 1980

[30] Foreign Application Priority Data

Jan. 17, 1979 [JP] Japan .................................. 54/4096

[51] Int. Cl.³ ............................................ F15B 9/10
[52] U.S. Cl. ......................................... 91/378; 91/28; 91/31; 91/451; 91/536; 60/547 A
[58] Field of Search ............ 91/378, 451, 452, 391 R, 91/431; 60/547 A, 547 B

[56] References Cited

U.S. PATENT DOCUMENTS

| | | | |
|---|---|---|---|
| 3,053,052 | 9/1962 | Garrison et al. | 91/378 |
| 3,532,027 | 10/1970 | MacDuff | 91/378 |
| 3,926,092 | 12/1975 | Meyers | 91/378 |
| 3,979,912 | 9/1976 | Kuromitsu | 91/391 R |
| 4,135,435 | 1/1979 | Adachi | 91/378 |

*Primary Examiner*—Paul E. Maslousky
*Attorney, Agent, or Firm*—Silverman, Cass & Singer, Ltd.

[57] ABSTRACT

A relief valve mechanism for a hydraulic booster provides in an open position a by-pass passage leading to a power steering and relieves excess pressure on the upstream side of the hydraulic booster. The relief valve in the open position forms a second throttle besides a normal fixed orifice to decrease through flow rate to the drain to thereby supply sufficient quantity of oil to the power steering when steering is steeply operated.

3 Claims, 5 Drawing Figures

RELIEF VALVE MECHANISM FOR A HYDRAULIC BOOSTER

BACKGROUND OF THE INVENTION

The present invention relates to a hydraulic booster for a fork lift truck, truck and an automobile, and more particularly to a relief valve mechanism for such a hydraulic booster.

When such a hydraulic booster is used for a fork lift truck, the control hydraulic circuit as shown in FIG. 1 may be used in which an oil pump 1 is driven by an engine 2 and sucks oil contained in a reservoir tank 3 to supply pressurized hydraulic oil through a passage 4 to a flow priority valve 5. The flow priority valve 5 supplies a portion of the hydraulic oil through a passage 6 to a hydraulic booster 8, of which the pressure is regulated by a relief valve 7. The rest of the pressurized hydraulic oil is supplied through a passage 10 to a lift control portion 11a and a tilt control portion 11b of a control valve 11. The control portions 11a and 11b are operated to control movement of the fork during loading and unloading. When a driver operates the lift control portion 11a to communicate the passage 10 with a lift cylinder 12, the lift cylinder 12 is extended to lift the fork. When the tilt control portion 11b is operated to communicate the passage 10 with a tilt cylinder 13, the tilt cylinder 13 is extended to tilt the fork so that free end of the fork extends upwardly. To lower the fork or to level the fork, the control portion 11a or 11b is operated to communicate the cylinder 12 or 13 with a drain passage 14 or 15 to contract the cylinder 12 or 13 by weight of load. A filter 16 is inserted in the drain passage 15 to eliminate foreign matters.

As will be described in detail hereinafter, a hydraulic booster 8 multiplies depressing force of a brake pedal 19 and transmits the multiplied force to a brake master cylinder 20 by the hydraulic pressure produced by throttling hydraulic oil flow in the way of the passages 6 and 17 and an operation valve 23 of a power steering 18. Master cylinder oil pressure from the brake master cylinder 20 actuates wheel cylinders 21 to brake the fork lift truck. A drain passage 22 from the hydraulic booster 8 and a drain passage 24 from the power steering operation valve 23 are both communicated with the drain passage 15.

When a steering handle 25 is in the neutral position shown in FIG. 1, the operation valve 23 of the power steering 18 communicates the passage 17 and actuating chambers 26 and 27 with a drain passage 24. When the steering handle 25 is rotated, the operation valve 23 communicates the passage 17 with one of the hydraulic chambers 26 and 27 according to the rotational direction, and communicates the drain passage 24 with the other hydraulic chamber, to perform force multiplied steering operation.

As the hydraulic booster 8 utilizes hydraulic pressure produced by throttling hydraulic oil flow between the passages 6 and 17, in order to assure sufficient quantity of hydraulic oil flow to be supplied to the power steering 18 even when the hydraulic booster 8 is in operation, and to avoid damage of the brake system due to excessive hydraulic pressure, the hydraulic booster 8 includes a relief valve mechanism which by-passes the hydraulic booster 8 and communicates the passage 6 directly with the passage 17.

FIG. 2 shows one example of a conventional relief valve mechanism. A relief valve B includes a main valve E which is slidable in a blind hole D formed in a booster body C perpendicularly to a port A to which the passage 17 is connected. A spring G is engaged with, and arranged between the main valve E and a plug F which closes the open end of the blind hole D, and resiliently urges the main valve E to the lowermost rest position shown in FIG. 2.

A groove H is formed on the inner periphery of the blind hole D and maintains oil flow in the port A even when the main valve E is closed. A shoulder I is formed on lower edge of the groove H.

The main valve E has a small diameter end portion J near the bottom of the blind hole D to form a shoulder K and to define a main valve chamber L which communicates with the passage 6.

A pilot chamber M is defined between the plug F and the main valve E. A valve seat N is secured to the upper end of the main valve E.

The pilot chamber M is communicated with the passage 6 through a passage O in the booster body C and an orifice P, and also with a drain passage S through a central opening Q of the valve seat N and a passage R in the main valve E.

Outside openings of the drilled passages O and S are closed by hammering seal balls T and U. The drain passage S formed in the booster body C is communicated with the drain passage 22.

In order to open or close the opening Q of the valve seat N, there is accommodated in the main valve E a pilot valve V which is urged by means of a spring W toward its closed position and actuated in response to the pressure within the pilot chamber M.

The relief valve supplies sufficient quantity of hydraulic oil to the power steering 18 in all the operating conditions of the hydraulic booster. When the throttle of the hydraulic booster 8 substantially decreases its opening area or shut the through flow of the throttle, or when the hydraulic booster is in the inoperative condition in which the throttle does not decrease the through flow rate, since the steering load of the power steering 18 is very large, oil pressure in upstream side of the throttle, i.e. in the conduit 6, is increased to reach a predetermined value determined by the force of the spring W, so that the pilot valve V is opened through the orifice P, passage O, pilot chamber M and the opening Q of the valve seat N. Thus oil flows partly through the pilot valve V and the passage S to the drain passage 22 (FIG. 1). By this, pressure is released downstream side of the orifice P, i.e. in the pilot chamber M. As the pressure in the passage 6 is directly applied in the main valve chamber L as stated previously, the pressure difference between the main valve chamber L and the pilot chamber M causes the main valve E to move upwardly against the spring G. Thus, the shoulder K is separated from the shoulder I to communicate the main valve chamber L with the groove H. There is thus formed a by-pass passage which extends from the passage 6 to the power steering 18 through the main valve chamber L, groove H and the port A. This by-pass passage is formed besides normal passage through the throttle of the hydraulic booster 8. When the throttle of the hydraulic booster 8 substantially decreases or shut the normal passage, oil pressure in the passage 6 is increased and the main valve E forms a clearance between the shoulders K and I, and oil demand of the power steering 18 is sufficiently satisfied. Thus, the relief valve mechanism determines upper limit of oil pressure in the passage 6, i.e. on the upstream side of the throttle of the hydraulic booster 8 to protect the associated elements from damages, and to assure demand of the power steering 18 to be satisfied in all the operating conditions of the hydraulic booster 8.

In such a conventional relief valve mechanism, oil pressure on the upstream side of the throttle of the hydraulic booster 8 is introduced from the passage 6 through the orifice P to the pilot valve V which releases oil when the oil pressure exceeds a predetermined value. When the power steering 18 is operated without actuating the hydraulic booster 8, or without depressing the brake pedal 19, oil pressure on the upstream side of the throttle to be supplied to the power steering exceeds the relief value of the relief valve V. This is particularly the case when steep steering is operated. In this case, oil quantity, which is to be supplied to the power steering 18 via the normal passage through the hydraulic booster and by-pass passage through the now opened main valve chamber L, is decreased by the release of the oil through the pilot valve V. Thus, oil demand of the power steering cannot be satisfied when steep steering is operated, response characteristics of the power steering 18 is substantially deteriorated. Also, as oil quantity through the orifice P and the pilot valve V is increased, undesired noise is produced.

SUMMARY OF THE INVENTION

Accordingly, the object of the present invention is to eliminate or at least mitigate the above-mentioned disadvantages.

According to the present invention, there is provided a relief valve mechanism of a hydraulic booster which includes a throttle valve formed by a spool cooperating with a brake pedal to throttle hydraulic oil flow supplied thereto when the brake pedal is depressed, and a power piston which moves in the depressed direction of the brake pedal to follow the spool by introducing oil pressure produced on the upstream side of the throttle valve into a boost chamber which is normally communicated with a drain chamber: said relief valve mechanism comprising a pilot chamber which is supplied with said upstream side oil pressure through an orifice; and a main relief valve applied with said upstream side oil pressure in opposition to the pressure supplied to the pilot chamber; said main relief valve including a pilot valve which communicates the pilot chamber with a drain passage when the oil pressure in the pilot chamber exceeds a predetermined value; said main relief valve being opened to pass therethrough said upstream side oil pressure to an outlet port when the main relief valve moves toward the pilot chamber; hydraulic oil on the upstream side of the throttle valve being supplied, in the opened position of the main relief valve, to a power steering in addition to the oil supplied through the throttle valve; a valve body of the main relief valve corporating in the opened position thereof with a wall of the pilot chamber to form a further throttle for the oil flow to be supplied to the pilot valve.

By thus forming a second throttle besides the orifice to the pilot chamber, when the relief valve fully opens the by-pass passage, relief oil flow rate through the pilot valve is substantially decreased so that oil demand of the power steering is satisfied, even though a steep steering is operated. Further, by decreasing the flow rate through the orifice and the pilot valve, undesirable operational noise is not produced.

Preferably, the valve body of the main relief valve has a flat small area portion disposed around an opening leading to the pilot valve to contact with the wall of the pilot chamber, and a tapered portion around said small area portion.

Thus, the through flow rate of the pilot valve can be determined as desired.

Other objects and advantages of the present invention will be apparent upon reference to the following detailed description of the invention taken in conjunction with the accompanying drawings.

DETAILED DESCRIPTION OF AN EMBODIMENT

Figure 1:
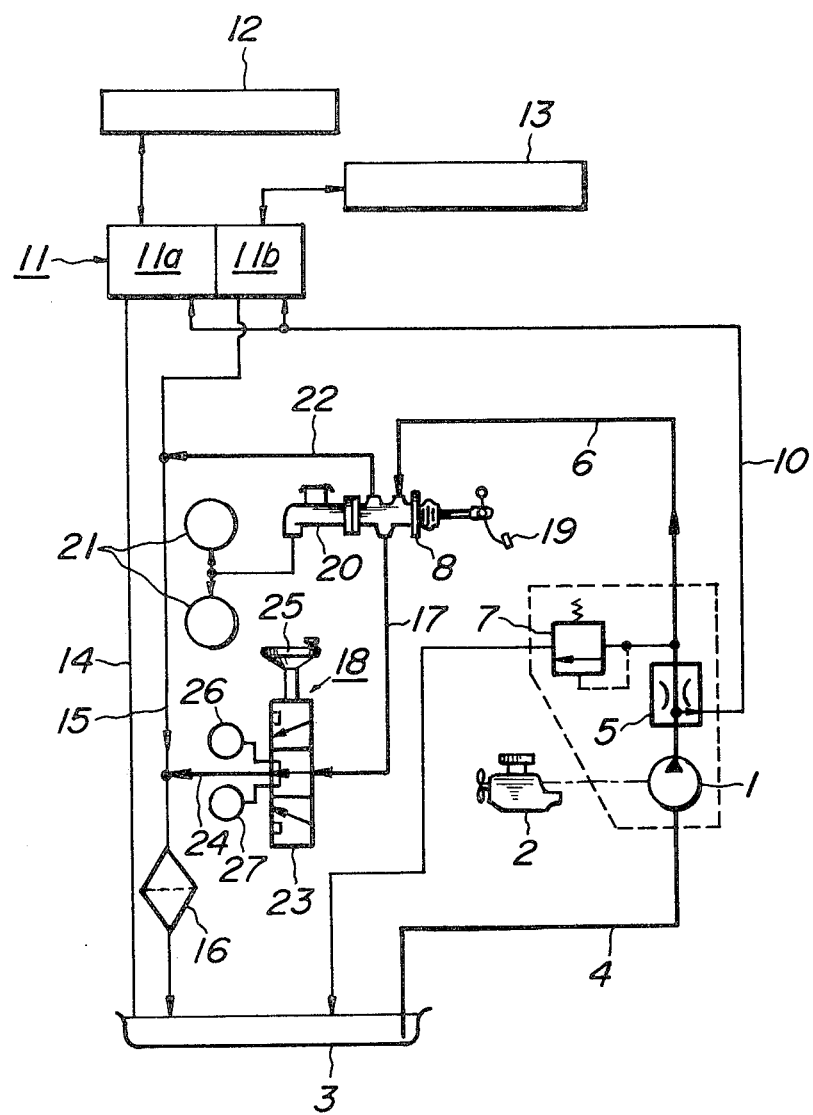
FIG. 1 is a hydraulic circuit diagram of a fork lift truck incroporating a known hydraulic booster.
Figure 2:
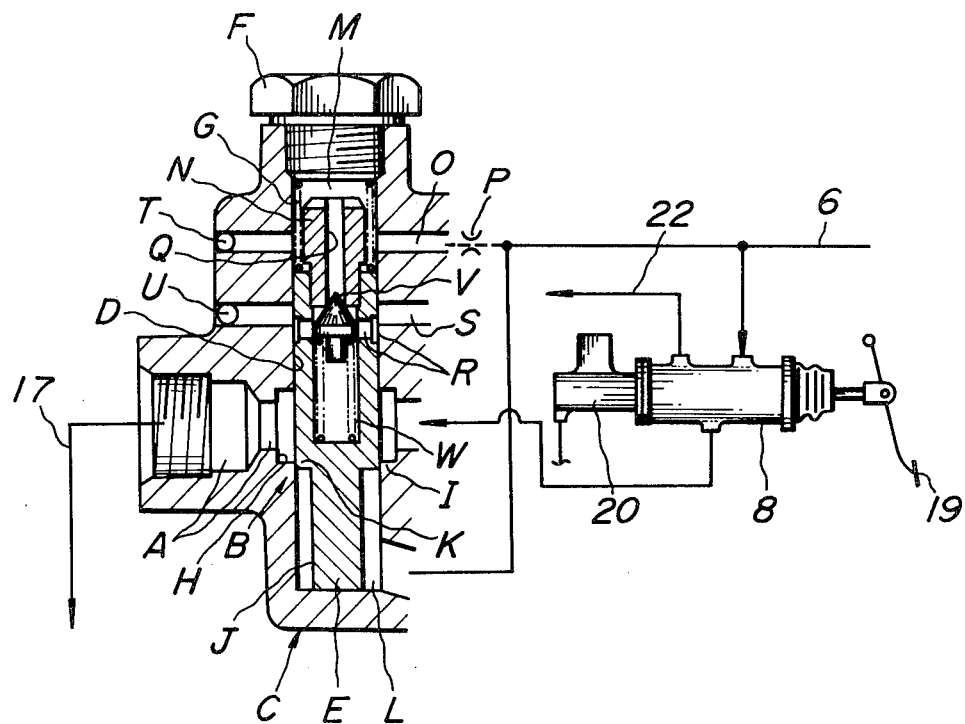
FIG. 2 is a sectional view of a conventional relief valve.
Figure 3:
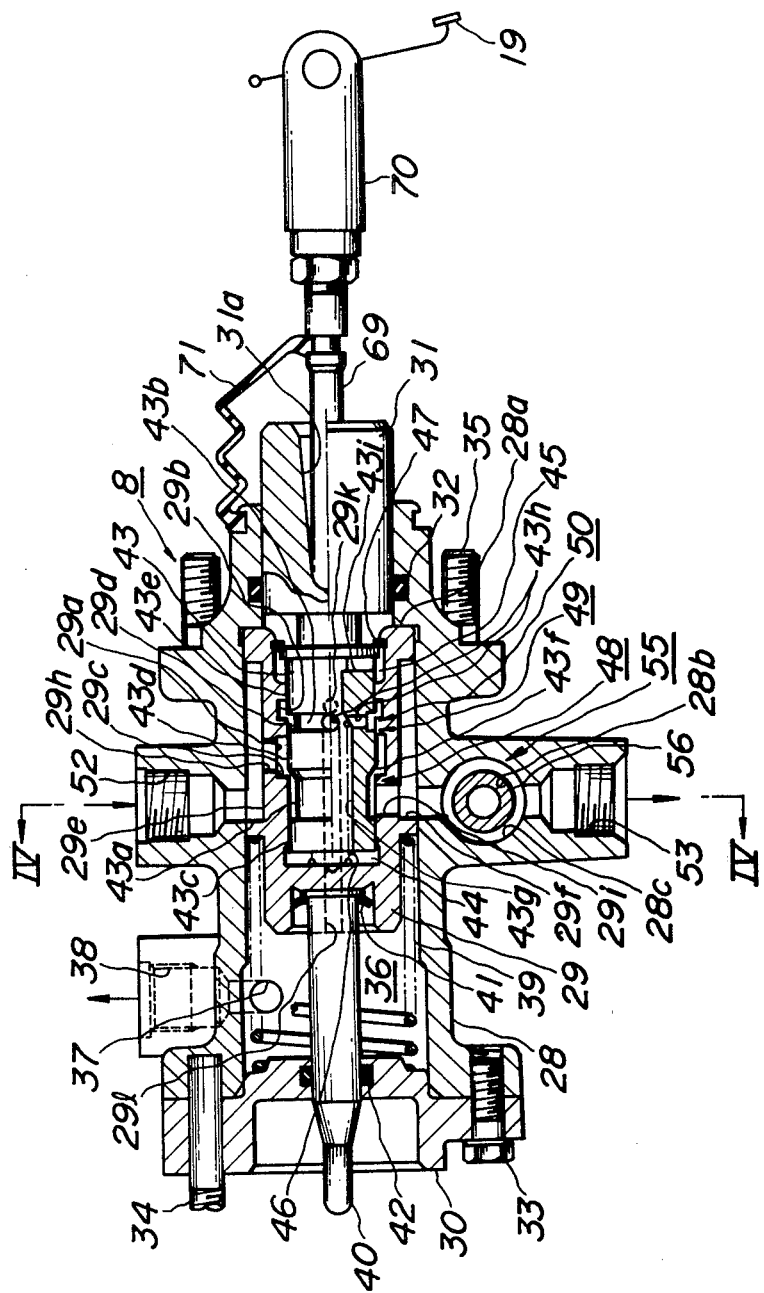
FIG. 3 is a longitudinal sectional view, taken along line III—III of FIG. 4, of a hydraulic booster including a relief valve according to the present invention.

Referring now to FIG. 3, a hydraulic booster 8 according to the present invention comprises a hollow booster body 28 which slidably contains a power piston 29. One end of the booster body 28 is closed by an end cover 30 and the other end opening slidably engages with an operating rod 31 which is liquid sealed by an O-ring 32. The end cover 30 is secured with the booster body 28 by bolts 33. Bolts 34 which are secured to the booster body 28 and extends through the end cover 30 serve to coaxially mount a master cylinder as shown in FIG. 1. Another end surface of the booster body is secured with bolts 35 which serve to mount the hydraulic booster 8 to a vehicle body.

Between the power piston 29 and the end cover 30, a drain chamber 36 is defined which is communicated through a communication port 37, with a drain port 38. A return spring 39 for the power piston 29 is engaged with the power piston 29 and the cover 30 to urge the power piston 29 rightwardly as shown in FIG. 3. A shoulder 28a of the booster body abuts the power piston 29 at the extreme right position thereof. On the surface of the power piston 29 which opposes with the cover 30, an output rod 40 is mounted coaxially by means of a stopper ring 41. The output rod 40 passes through the end cover 30 sealed by an O-ring 42, and the projected end of the rod 40 abuts against a piston cup of the master cylinder 20 shown in FIG. 1.

The other end surface of the power piston 29 is formed with a blind bore which slidably engages with a spool 43. The inner periphery of the blind bore is formed with two peripheral grooves 29a and 29b which define a shoulder 29c and a spool guide 29d. Outer periphery of the spool 43 is formed with two grooves 43a and 43b to define three lands 43c, 43d and 43e. The end surface of the land 43c defines a chamber 44. A tapered surface 43f is formed between the land 43d and the groove 43a. The land 43e projects into a boost chamber 45.

The spool 43 is formed with a central opening 43g. A spring 46 engages in the central opening 43g and abuts at its one end with the power piston 29 while the other end of the spring 46 engages with the spool 43 to urge the spool 43 rightwardly in FIG. 3. The right end surface of the spool 43 abuts against the left end surface of the operating rod 31. The left end of the operating rod is engaged with a snap ring 47, which is mounted on the power piston 29, to limit rightward displacement of the operating rod 31, or to prevent withdrawal thereof.

The spool 43 is formed with a radial through bore 43h extending between the groove 43b and the central opening 43g, as well as a radial through bore 43i extending between the central opening 43g and the boost chamber 45. The shoulder 29c corporates with the tapered surface 43f to form a throttle 48, as will be described in detail hereinafter. The guide 29d and the land 43d forms a control valve 49, and the guide 29d and the land 43e forms a return valve 50.

Figure 4:
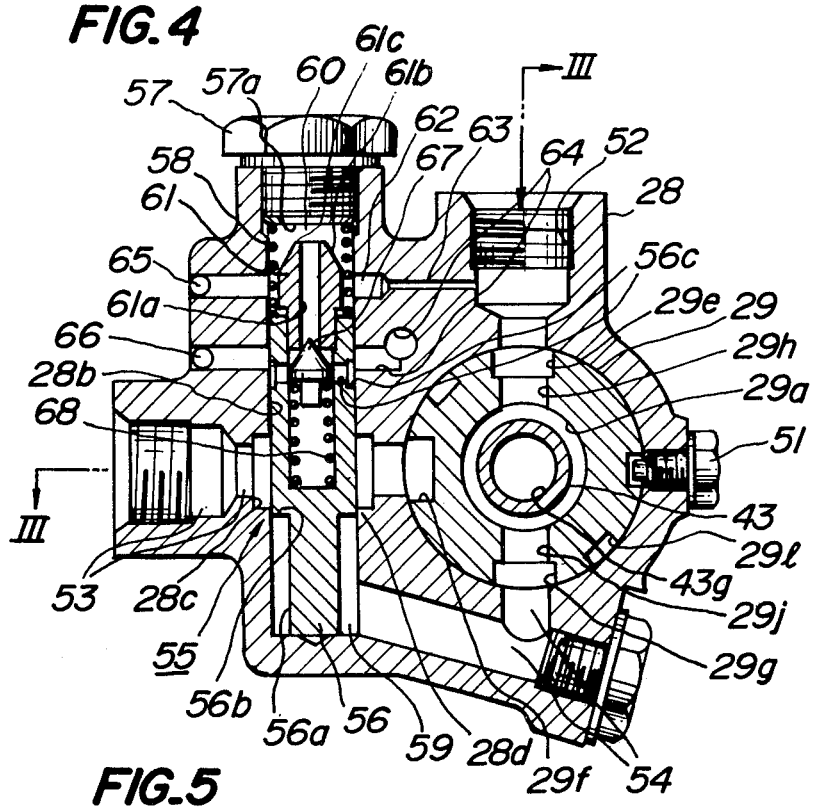
FIG. 4 is a sectional view taken along line IV—IV of FIG. 3.

As shown in FIG. 4, outer periphery of the power piston 29 is formed with three longitudinal grooves 29e, 29f and 29g. The power piston 29 is kept from rotation by a bolt 51 which is threaded into the booster body 28. An inlet port 52, an outlet port 53 and a connection port 54 are communicated with the longitudinal grooves 29e, 29f and 29g, respectively, at full stroke of the power piston 29. The longitudinal groove 29e is communicated with the groove 29a by a through bore 29h, the longitudinal groove 29f with the groove 43a by a through bore 29i, and the longitudinal groove 29g with the groove 29a by a through bore 29j. The power piston 29 is further formed with a radial bore 29k extending between the groove 29b and the outer periphery, and the radial bore 29k is communicated with the drain chamber 36 by a longitudinal groove 29l formed on the outer periphery of the power piston 29.

A relief valve 55 is provided in the outlet port 53, as shown in FIG. 4, and includes a main valve 56 which is slidable in a blind hole 28b formed in the booster body 28 perpendicularly to the port 53. A spring 58 is disposed between, and engaged with the main valve 56 and a plug 57 which closes the blind hole 28b to elastically urge the main valve 56 toward the lowermost position shown in FIG. 4. A peripheral groove 28c is formed around the main valve 56 so that the port 53 is communicated with the groove 28c to by-pass the main valve 56. The groove 28c forms a shoulder 28d. The lower end 56a of the main valve 56 has a small diameter to define a shoulder 56b, and forms a main valve chamber 59 which is communicated with the communication port 54.

A pilot chamber 60 is formed between the lower end surface of the plug 57 and the upper end surface of the main valve 56. A valve seat 61 is fitted to the upper end of the main valve 56. The pilot chamber 61 is communicated through an oil passage 62 and an orifice 63, both formed in the booster body 28, to the outlet port 53, and through a central opening 61a of the valve seat 61 and radial oil passages 56c formed in the main valve 56 to a drain passage 64. The open ends of the passages 62 and 64 formed by drilling through the booster body 28 are sealed by hammering of seal balls 65 and 66. The drain passage 64 formed in the booster body 28 is communicated with the drain chamber 36 (FIG. 3). To control the opening of the central opening 61a of the valve seat 61, a pilot valve 67 is accommodated in the main valve 56, and is urged to the closed position by a spring 68 and actuated in response to the pressure in the pilot chamber 60.

As shown in FIG. 3, outer end surface of the operating rod 31 is formed with a conical blind hole 31a which abuts one end of an input rod 69. The other end of the input rod 69 is connected through a clevis 70 with a brake pedal 19. A dust boot 71 of which upperhalf only is shown is connected with the booster body 28 and the input rod 69 to seal the operating rod 31 from dust.

The hydraulic booster 8 shown in FIGS. 3 and 4 is connected in the hydraulic circuit shown in FIG. 1, such that the oil passage 6 is connected with the inlet port 52, and passages 17 and 22 are connected with the outlet port 53 and the drain port 38, respectively.

Operation of the hydraulic booster, according to the present invention, is as follows:

FIGS. 3 and 4 show inoperative position of the hydraulic booster 8. Hydraulic oil supplied from the passage 6 shown in FIG. 1 is passed through the inlet port 52, longitudinal groove 29e, through bore 29h, groove 29a, throttle 48, through bore 29i, longitudinal groove 29f, groove 28c, outlet port 53 and the passage 17 shown in FIG. 1, and is supplied to the power steering 18. Also, hydraulic oil supplied to the inlet port 52 passes through the longitudinal groove 29e, radial opening 29h, groove 29a, through bore 29j, longitudinal groove 29g and the communication port 54 to the main valve chamber 59. As the valve 56 closes the main valve chamber 59 from the outlet port 53 by the shoulders 28d and 56b, the hydraulic oil is enclosed in the main valve chamber 59, so that the power steering 18 is not supplied with the hydraulic oil from the outlet port 53. As the control valve 49 is closed by overlapping of the land 43d with the guide 29d, and the return valve 50 is opened between the lands 43e and 29d, the boost chamber 45 is communicated, through the radial opening 43i, hollow hole 43g, radial opening 43h, grooves 43b and 29b, radial bore 29k, longitudinal groove 29l, drain chamber 36, drain port 38 and the passage 22 shown in FIG. 1, with drain circuit.

Figure 5:
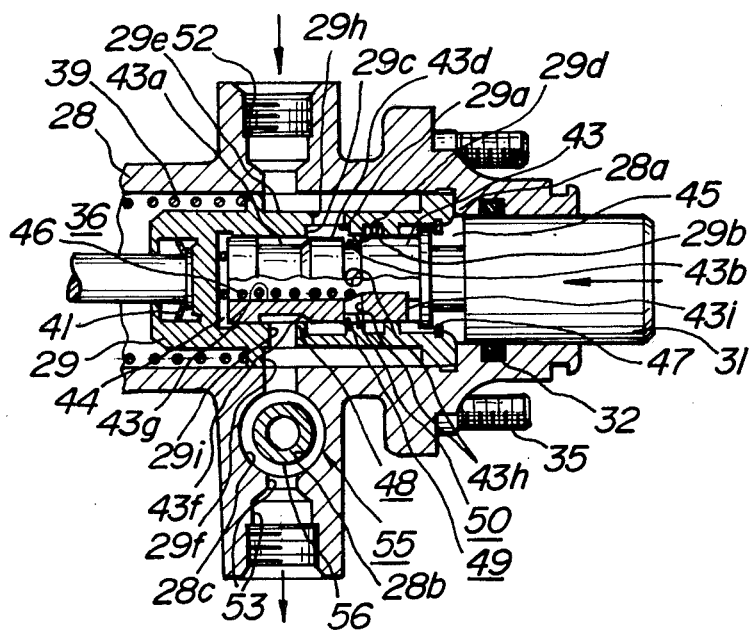
FIG. 5 is a partial sectional view of the hydraulic booster shown in FIG. 3, showing an operational position thereof.

When the brake pedal 19 is depressed, the input rod 69 and the operating rod 31 displace the spool 43 leftwardly in FIG. 3 to the position shown in FIG. 5. Thus, distance between the tapered surface 43f and the shoulder 29c is decreased so that the throttle 48 is formed therebetween to limit the hydraulic oil flow rate from the groove 29a to the groove 43a. At the same time, the return valve 50 is closed and the control valve 49 is opened. Thus, hydraulic pressure is produced by the throttle 48 in the upstream side groove 29a, and is supplied, through the control valve 49, groove 43b, radial bore 43h, central opening 43g and the radial bore 43i, to the boost chamber 45. The hydraulic pressure in the boost chamber 45 urges the right end surface of the power piston 29 toward left in FIGS. 3 and 5, so that the power piston 29 is hydraulically moved to a new balanced position. By repeating the operation, in response to depression of the brake pedal 19, the power piston 29 follows the operating rod 31 and the spool 43, and displaces hydraulically so that the master cylinder 20 is operated through the output rod 40 to brake the vehicle by hydraulically multiplied force.

When the brake pedal 19 is depressed by strong force such that the spool 43 contacts with the bottom of the blind central opening of the power piston 29, and that the throttle 48 is closed by the tapered surface 43f contacting with the shoulder 29c, hydraulic oil is not permitted to flow to the power steering 18 through the throttle 48 and the maximum oil pressure determined by the relief valve 55, as will be described later, is produced in the groove 29a. The pressure is transmitted in the boost chamber 45 as previously described to urge the power piston 29 by the strongest force to perform an emergency braking action.

According to the present invention, as shown in FIG. 4, upper end surface of the valve seat 61 is removed away leaving only a small area around the central opening 61a, by forming a tapered portion 61b. Thus, when the pressure in the pilot chamber 60 is decreased, the valve seat 61 and the main valve 56 move upwardly and a flat end surface 61c of the valve seat 61 contacts with a flat end surface 57a of the plug 57.

The relief valve mechanism shown in FIGS. 3 and 4, according to the present invention, supplies hydraulic oil to the power steering 18 irrespective of the operating condition of the hydraulic booster 8, corresponding to the steering load. This is achieved even in the event that the operating conditions of the hydraulic booster 8 is such that the throttle 48 greatly reduces or even nullifies oil flow to the outlet port 53 or the hydraulic booster 8 is inoperative. As the load of the power steering 18 is large, oil pressure on the upstream side of the throttle 48 is increased to a predetermined value which is determined by the spring 68, and this oil pressure is supplied from the inlet port 52 through the orifice 63, passage 62, pilot chamber 60 and the valve seat opening 61a to the pilot valve 67 and opens the pilot valve 67. Thus, a portion of oil is released from the valve seat opening 61a and the pilot valve 67 through the passages 56c and 64, drain chamber 36, port 38 and the drain passage 22 shown in FIG. 1. By the released oil flow, the pressure drops on the downstream side of the orifice 63, namely in the pilot chamber 60, so that the oil pressure in the main valve chamber 59 urges the main valve 56 against the spring 58 upwardly in FIG. 4. Thus, the shoulder 56b moves upwardly from the shoulder 28d to communicate the main valve chamber 59 with the groove 28c and the outlet port 53. Hydraulic oil supplied to the port 52 normally flows through the throttle 48, through bore 29i, longitudinal groove 29f and the groove 28c to the outlet port 53, as described hereinbefore. When the throttle 48 substantially reduces the oil flow rate or closes the passage, the oil pressure in the inlet port 52 is increased, and the relief valve 55 is actuated to open the passage between the shoulders 56b and 28d. Thus, oil flows from the inlet port 52 through the longitudinal groove 29e, through bore 29h, groove 29a, through bore 29j, longitudinal groove 29g, communication port 54, main valve chamber 59 and groove 28c to the outlet port 53. In this manner, hydraulic oil is supplied to the power steering 18 in all the operating conditions of the hydraulic booster 8. As described, the relief valve 55 limits the oil pressure on upstream side of the throttle 48 to prevent the assembled elements from destroying, and also assures the power steering 18 to be supplied with the oil flow regardless of operating conditions of the hydraulic booster 8.

When the above-mentioned operation is effected in a condition in which the power steering 18 is inoperative and the hydraulic booster only is operative, the outlet port 53 is communicated with the drain chamber. Thus, when the main valve chamber 59 is communicated with the groove 28c, oil pressure in the main valve chamber 59 is decreased, so that the main valve 56 moves downwardly by the force of the spring 58 and by the pressure in the pilot chamber 60, to close the communication through the clearance between the shoulders 28d and 56b. Then, the oil pressure in the main valve chamber 59 increases to open the relief valve 55. Such an operation is repeated until the relief valve 55 is stopped by the function of the orifice 63 at a balanced position in which a portion of oil flows through the valve formed by the clearance between the shoulders 28d and 56b. In this instance, oil pressure applied to the boost chamber of the hydraulic booster is lower than the upper limit value, so that leakage from the pilot valve 67 is relatively small. Thus, oil flows through the orifice 63 without producing operation noise.

When the power steering 18 is operated in such a stable state of the relief valve, oil pressure in the upstream is increased so that the back pressure in the outlet port 53 is also increased. Thus, pressure difference between the groove 28c and the main valve chamber 59 is decreased while oil pressure in the main valve chamber 59 is increased, so that the main valve 56 is displaced upwardly in FIG. 4 such that the top end 61c of the valve seat 61, which is integral with the main valve 56, contacts with the end surface 57a of the plug 57. Thus, oil passage between the pilot chamber 60 and the central opening 61a is substantially decreased. Hydraulic oil from the inlet port 52 flows through the orifice 63, passage 62, pilot chamber 60, clearance between the end surface 61c of the valve seat 61 and the end surface 57a of the plug 57, central opening 61a and passage 64 to the drain chamber. As there are two throttle portions, i.e. the orifice 63 as well as the throttled passage between the pilot chamber 60 and the central opening 61a, both serving to decrease the flow rate, small quantity of oil is released. Because of the small quantity of the released oil, noise is not produced in the two throttle portions. As large portion of the oil discharged by the pump is supplied to the power steering 18, operational response of the power steering is not disturbed. When the end surface 61c of the valve seat 61 of the main valve 56 contacts with the end surface 57a of the plug 57, pressure receiving area of the pilot chamber 60 is decreased by the area of the end surface 61c, so that as long as the pressure in the main valve chamber 59 and hence, the back pressure in the outlet port 53 is not decreased, the main valve maintains the uppermost position.

In such an operating condition, when the power steering 18 is released to drive the vehicle along a straight road, back pressure in the outlet port 53 is decreased. As the pressure in the main valve chamber 59 tends to decrease also, the main valve 56 moves downwardly in FIG. 4, by the oil pressure in the pilot chamber 60 and the force of the spring 58. By the decreased distance between the shoulders 56b and 28d, oil pressure in the main valve chamber 59 and the port 52 is not excessively decreased. Thus, oil pressure in the boost chamber 45, which is in communication with the inlet port 52 through the longitudinal groove 29e, opening 29h, grooves 29a and 43a, opening 43h, through bore 43g and the radial bore 43i, is prevented from decreasing to a value which causes temporary return movement or kick-back of the power piston 29, operating rod 31 and the brake pedal 19.

When the relief valve is actuated in an operating condition in which the hydraulic booster is inoperative and the power steering is operative, oil pressure on the upstream side of the oil passages is increased so that pressure in the inlet port 52 is also increased through the outlet port 53 and the throttle 48 in the booster apparatus. By this, pressure in the main valve chamber 59 also increases. When the pressure in the main valve chamber 59 exceeds a predetermined value, the pilot value 61 operates in the manner previously stated, so that the main valve 56 moves upwardly such that the top end 61a of the valve seat 61 contacts with the end surface 57a of the plug 57 to form a double orifice in conjunction with the orifice 63 and to reduce the leakage of oil. Thus, response characteristic of the power steering is not deteriorated and the operating noise is not produced.

From the foregoings, it will be appreciated that the relief valve according to the present invention is provided with the flat top end 61c of small area around the central opening 61a of the valve seat 61, which top end 61c contacts with the opposed end surface 57a of the plug 57 during operation such that pressure in the pilot chamber 60 acts on the valve excluding the small flat top end 61c. Such a mode of contact ensures leakage of hydraulic oil to be decreased, response characteristics of the power steering to be undisturbed, and noise by the leakage to be suppressed.

What is claimed is:

1. A relief valve mechanism of a hydraulic booster which includes a main throttle valve, through which hydraulic oil is supplied to a power steering, said main throttle valve being formed by a spool cooperating with a brake pedal to throttle hydraulic oil flow supplied thereto when the brake pedal is depressed, and a power piston which moves in the depressed direction of the brake pedal to follow the spool by introducing oil pressure produced on the upstream side of the main throttle valve into a boost chamber which is normally communicated with a drain chamber:

said relief valve mechanism comprising a pilot chamber which is supplied with said upstream side oil pressure through an orifice;

and a main relief valve applied with said upstream side oil pressure in opposition to the pressure supplied to the pilot chamber;

said main relief valve including a pilot valve which communicates the pilot chamber with a drain passage when the oil pressure in the pilot chamber exceeds a predetermined value;

said main relief valve being in opened position for passage therethrough of said upstream side oil pressure to the power steering independently of said oil supply to the power steering through the main throttle valve; and said main relief valve further including a valve body cooperating, in said opened position of said main relief valve, with a wall of the pilot chamber to form a further throttle for the oil flow to be supplied to the pilot valve.

2. A mechanism as claimed in claim 1, wherein said valve body of the main relief valve is fitted at its upper end with a tubular valve seat having a central passage forming a conduit between said pilot chamber and said pilot valve, and wherein the tubular valve seat is tapered toward a flat, narrow end formed thereon, which end is engageable with said wall of said pilot chamber to close said tubular valve seat.

3. The mechanism as claimed in claim 1 or 2, wherein said main relief valve is opened when the pilot valve communicates the pilot chamber with the drain passage.

* * * * *